United States Patent
Hung

(10) Patent No.: US 7,319,797 B2
(45) Date of Patent: Jan. 15, 2008

(54) ADAPTIVE FILTERS AND APPARATUS, METHODS, AND SYSTEMS FOR IMAGE PROCESSING

(75) Inventor: Szepo Robert Hung, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 11/043,276

(22) Filed: Jan. 25, 2005

(65) Prior Publication Data
US 2006/0245660 A1 Nov. 2, 2006

Related U.S. Application Data

(60) Provisional application No. 60/583,779, filed on Jun. 28, 2004.

(51) Int. Cl.
G06K 9/40 (2006.01)

(52) U.S. Cl. ............ 382/260; 455/213; 708/300; 702/17

(58) Field of Classification Search ........ 382/100, 382/254, 260, 261, 275, 262, 263; 708/300; 702/17, 69, 191, 195; 348/241, 533, 606, 348/607; 375/254; 358/3.04, 463; 455/213
See application file for complete search history.

(56) References Cited

U.S. PATENT DOCUMENTS

| | | | |
|---|---|---|---|
| 5,450,216 A * | 9/1995 | Kasson .................. 358/518 |
| 5,594,854 A | 1/1997 | Baldwin et al. ............ 395/141 |
| 5,611,000 A * | 3/1997 | Szeliski et al. ............. 382/294 |
| 6,008,796 A | 12/1999 | Vaswani et al. ........... 345/155 |
| 6,725,174 B2 | 4/2004 | Bouts et al. ................ 702/181 |
| 6,809,740 B1 | 10/2004 | Weed ...................... 345/589 |
| 7,034,885 B1* | 4/2006 | Koyanagi et al. .......... 348/441 |
| 2003/0081677 A1* | 5/2003 | Segman ................. 375/240.13 |
| 2003/0107582 A1 | 6/2003 | Maeda et al. ............... 345/611 |
| 2003/0189655 A1* | 10/2003 | Lim et al. .................. 348/241 |
| 2004/0052432 A1* | 3/2004 | Lee et al. .................. 382/298 |
| 2004/0071363 A1* | 4/2004 | Kouri et al. ............... 382/276 |
| 2005/0276510 A1* | 12/2005 | Bosco et al. ............... 382/275 |

OTHER PUBLICATIONS

Scale-Space and Edge Detection Using Anisotropic Diffusion; IEEE Transactions on Pattern Analysis and Machine Intelligence, vol. 12, No. 7 (Jul. 1990); pp. 629-639.
Adaptive Soothing: A General Tool for Early Vision; IEEE Transactions on Pattern Analysis and Machine Intelligence, vol. 13, No. 6 (Jun. 1991); Ogs. 514-529.

(Continued)

Primary Examiner—Bhavesh M Mehta
Assistant Examiner—Anand Bhatnagar
(74) Attorney, Agent, or Firm—Matthew J. Evans; Kyong H. Macek; Thomas R. Rouse

(57) ABSTRACT

An adaptive filter according to one embodiment includes an N×N two-dimensional convolution, where N is an odd integer greater than one. Pixels of an image are filtered by moving the N×N kernel across the image. At each pixel location, the kernel coefficients are determined by the image pixels within the N×N region, such that the kernel coefficients may change from one pixel location to the next. Such a filter may be implemented to use a lookup table to approximate a floating-point operation.

36 Claims, 12 Drawing Sheets

OTHER PUBLICATIONS

Division Algorithms and Implementations; IEEE Transactions on Computers, vol. 46, No. 8 (Aug. 1997); pp. 833-854.

Speckle Reducing Anisotropic Diffusion; IEEE Transactions on Image Processing, vol. 11, No. 11 (Nov. 2002); pp. 1260-1270.

Jones, D. (1999) Reciprocal Multiplication, a tutorial. XP-002362368.

Plataniotis, K.N., et al. (1998) Adaptive filters for multichannel signal processing. IEEE pp. 67-71.

Tang, P.T. Table-lookup algorithms for elementary functions and their error analysis. pp. 232-236.

* cited by examiner

| table 120 | Base value F |
|---|---|
| Interval 1 | 128 |
| Interval 2 | 120 |
| Interval 3 | 100 |
| Interval 4 | 73 |
| Interval 5 | 47 |
| Interval 6 | 27 |
| Interval 7 | 13 |
| Interval 8 | 6 |

FIG. 8b

| table 110 | Base value F |
|---|---|
| Interval 1 | 1 |
| Interval 2 | 0.939413063 |
| Interval 3 | 0.778800783 |
| Interval 4 | 0.569782825 |
| Interval 5 | 0.367879441 |
| Interval 6 | 0.209611387 |
| Interval 7 | 0.105399225 |
| Interval 8 | 0.046770622 |

FIG. 8a

|  | Base value F | Evaluation point P | Slope value S |
|---|---|---|---|
| Interval 1 | 1 | 0 | -0.001893342 |
| Interval 2 | 0.939413063 | 32 | -0.005019134 |
| Interval 3 | 0.778800783 | 64 | -0.006531811 |
| Interval 4 | 0.569782825 | 96 | -0.006309481 |
| Interval 5 | 0.367879441 | 128 | -0.004945877 |
| Interval 6 | 0.209611387 | 160 | -0.00325663 |
| Interval 7 | 0.105399225 | 192 | -0.001832144 |
| Interval 8 | 0.046770622 | 224 | -0.001461582 |

FIG. 10a

| Base value F | Evaluation point P | Slope value S |
|---|---|---|
| 128 | 0 | -8 |
| 120 | 32 | -21 |
| 100 | 64 | -27 |
| 73 | 96 | -26 |
| 47 | 128 | -20 |
| 27 | 160 | -13 |
| 13 | 192 | -8 |
| 6 | 224 | -6 |

FIG. 10b

| Divisor | Multiplier | Shift |
|---|---|---|
| 0.1 | 12.8 | 7 |
| 0.2 | 25.6 | 7 |
| 0.3 | 38.4 | 7 |
| 0.4 | 51.2 | 7 |
| 0.5 | 1.0 | 1 |
| ... | ... | ... |
| 4.0 | 4.0 | 0 |

FIG. 12a

| Divisor | Multiplier | Shift |
|---|---|---|
| 0.25 | 1 | 2 |
| 0.5 | 1 | 1 |
| 0.75 | 3 | 2 |
| 1.0 | 1 | 0 |
| 1.25 | 5 | 2 |
| ... | ... | ... |
| 4.0 | 4 | 0 |

FIG. 12b

ADAPTIVE FILTERS AND APPARATUS, METHODS, AND SYSTEMS FOR IMAGE PROCESSING

The present application for patent claims priority to Provisional Application No. 60/583,779 entitled "An Edge Preserving and Flexible Adaptive Noise Filter for Imaging Applications" filed Jun. 28, 2004 and assigned to the assignee hereof and hereby expressly incorporated by reference herein.

FIELD OF THE INVENTION

This invention relates to signal processing, and in particular, digital image processing.

BACKGROUND

Noise filtering is a very important operation in digital image processing. For example, the pixels in a signal produced by an image sensor such as a CCD (charge-coupled device) or CMOS (complementary metal-oxide-semiconductor) device may be corrupted by several types of noise, such as reset (or kTC) noise, photon shot noise, dark current, and thermal noise. The characteristics of this noise may be related to factors such as the particular fabrication process, local variations in the sensor or other circuitry such as amplifiers, and ambient conditions (e.g. temperature, level of illumination). The noise may include components that are characterizable, such as, but not limited to multiplicative noise, and/or components that are random.

During processing of the image signal, the noise may be amplified, and the visual quality of the final image may be reduced. Noise problems may be especially acute in particular situations, such as mobile imaging applications that use compact sensor modules having small pixel areas (e.g. in cellular telephones, personal digital assistants (PDAs), or wearable devices such as wristwatches). Moreover, these situations may demand solutions that are computationally inexpensive.

Noise problems may also arise in imaging applications that make use of nonvisible radiation. For example, high-frequency or impulsive noise may also be manifested as speckle in synthetic aperture radar (SAR) images, which are typically generated using microwave radiation.

SUMMARY

According to one embodiment, a method of processing an image including a subject pixel comprises calculating a distance between the neighbor pixel and the subject pixel for each of a plurality of neighbor pixels in a neighborhood of the subject pixel. The method also comprises selecting, for each of the calculated distances and from among a plurality of intervals, an interval that includes the calculated distance; and obtaining, for each of the plurality of neighbor pixels, a value weight based on the corresponding selected interval. The method includes calculating a value for the subject pixel based on values of the neighbor pixels, including weighting the value of each of the plurality of neighbor pixels by the corresponding value weight.

According to another embodiment, an apparatus for processing an image including a subject pixel comprises a distance calculator configured to calculate a distance between the neighbor pixel and the subject pixel for each of a plurality of neighbor pixels in a neighborhood of the subject pixel. The apparatus includes an interval selector configured to select, for each of the calculated distances and from among a plurality of intervals, an interval that includes the calculated distance; and a value weight calculator configured to calculate, for each of the plurality of neighbor pixels, a value weight based on the corresponding selected interval. The apparatus also includes a pixel value calculator configured to calculate a value for the subject pixel based on values of the neighbor pixels by weighting the value of each of the plurality of neighbor pixels by the corresponding value weight. Further embodiments and devices and systems including and/or capable of performing such embodiments are disclosed herein.

BRIEF DESCRIPTION OF THE DRAWINGS

FIGS. 6a-6d show series of comparisons that may be performed in implementations of task T130.
FIGS. 8a and 8b show examples of base value tables.
FIGS. 10a and 10b show examples of tables F, S, and P.
FIGS. 12a and 12b show examples of tables that may be used in performing multiplicative division.

DETAILED DESCRIPTION

Figure 1:
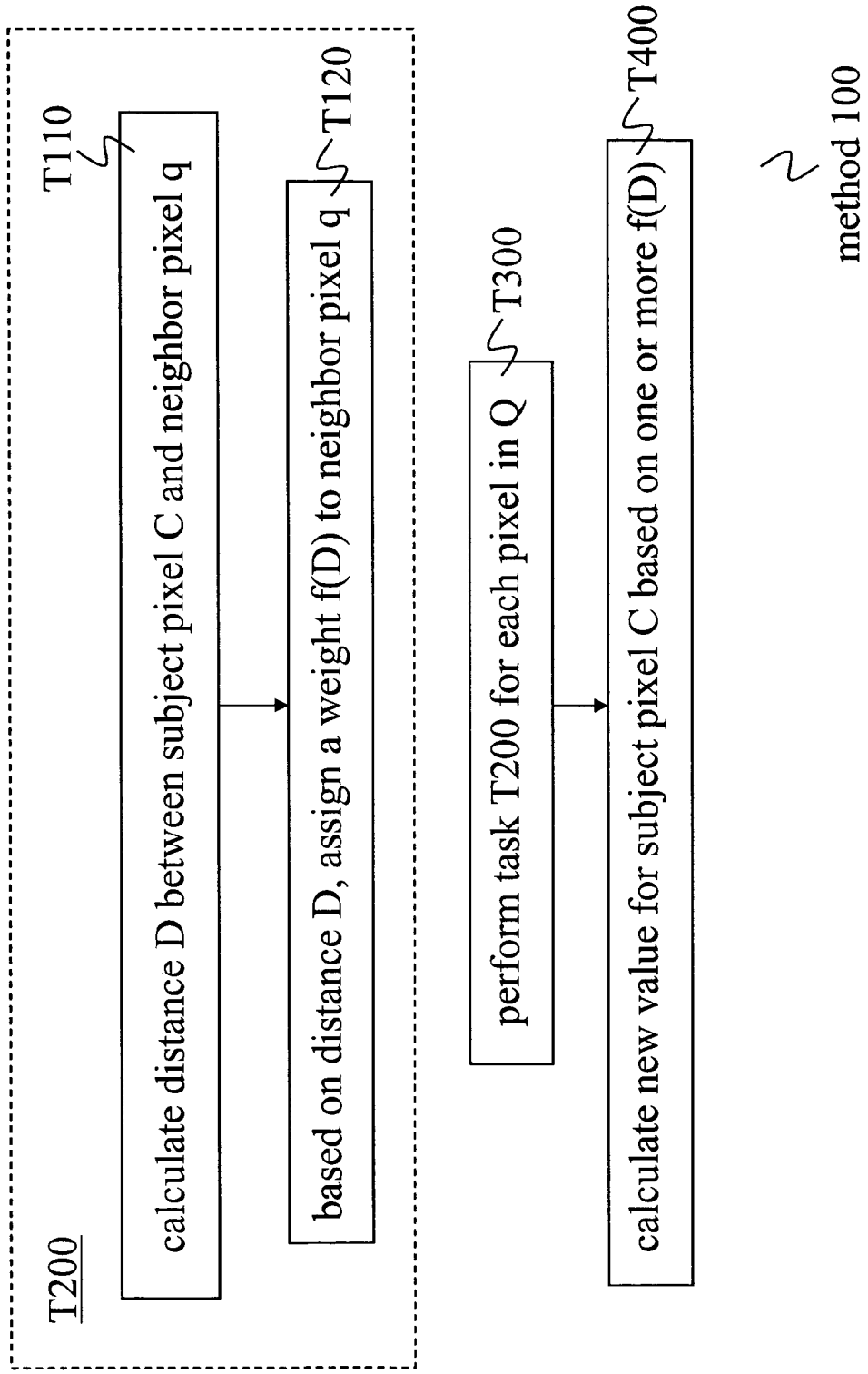
FIG. 1 shows a diagram of a method 100 according to an embodiment.

One traditional method of noise reduction is to perform low-pass filtering. While such a method may be effective in removing high-frequency noise, it also tends to cause image blurring and a result that appears out-of-focus. Another method is to perform an adaptive filtering. Adaptive filters may be used to preserve edges by avoiding smoothing across an edge boundary. Such a filter may produce an image that looks sharp because edges remain sharp while noise is smoothed. However, currently existing adaptive filters are too computationally expensive to be practical in real-time or near-real-time imaging applications.

Principles described herein may be applied to methods of modifying a value of a subject pixel based on values of neighboring pixels. Such a method may include weighting a value of a neighboring pixel in inverse nonlinear proportion to its distance from the subject pixel. Such a method may also be extended to obtain an image by adaptively filtering (e.g. convolving with an adaptive mask) an input image using new adaptive filtering techniques. The input image may represent uncompressed pixel data based on an image outputted by a CCD or CMOS sensor.

Embodiments include effective and simple-to-implement methods and filters to perform noise reduction while preserving edges. Such embodiments may be implemented in a simple fashion using lookup tables. Such embodiments may also offer flexibility to the filter designer, as they may be implemented without being limited to a specific weighting function. Based on the noise characteristics, for example, such an embodiment may be reconfigured to use a different weighting function, e.g. in order to balance noise reduction and edge preservation behaviors.

An adaptive filter according to one embodiment includes an N×N two-dimensional convolution, where N is an odd integer greater than one. Pixels of an image are filtered by moving the N×N kernel across the image. At each pixel location, the kernel coefficients are determined by the image pixels within the N×N region, such that the kernel coefficients may change from one pixel location to the next.

A value of a pixel in an image may be represented as I(x,y), where x and y indicate the location of the pixel in the horizontal and vertical directions, respectively. The coefficients of the N×N kernel may be determined by an equation of the form $$w(i, j) = f(|I(x + i, y + i) - I(x, y)|), \quad (A)$$

$$\text{where } -\frac{N-1}{2} \le i, j \le \frac{N-1}{2}.$$

The weighting function f used to determine the coefficients in the kernel may be monotonic and decreasing. The input to function f includes nonnegative numbers from zero to infinity (or some positive number w). The output of function f is a nonnegative number f_max when the input is zero, and a nonnegative number f_min<f_max when the input is infinity (or w): $f(0)=f\_max$, $f(\infty)$ (or $f(w)$)=f_min. The values of f_min and f_max may be chosen such that the range between them provides a sufficient number of discrete steps to allow weighting pixel value differences as desired.

From expression (A), it may be understood that at the center of the kernel (where i=j=0), the weighting is greatest because $w(0,0)=f(0)=f\_max$, and that the weighting is less when the pixel difference is large. In such fashion, the kernel is adaptive based on the pixels in the N×N region. When the kernel coefficients have been determined, their sum is computed for normalization (to be performed e.g. after the convolution).

Typically, a weighting function f is a complex function such as a Gaussian, exponential, or polynomial function that may require time-consuming floating-point computation. Principles as disclosed herein may be applied to provide a good approximation of such floating-point computation while greatly reducing the computational complexity.

Implementations of methods and apparatus as disclosed herein may include a lookup table $F_1$, which is an array of L sub-sampled values of function f; a lookup table $P_1$, which is an array of the L pixel value differences at which the function f is evaluated to obtain the corresponding entry in table $F_1$; and a lookup table $S_1$, which is an array of L−1 entries that each indicate the slope of a line connecting $F_1[i]$ and $F_1[i+1]$ for i={0, 1, . . . L−2}. Such lookup tables may be stored in local memory and/or in external memory, and as one large table or as multiple tables.

If the absolute value of the pixel value difference is denoted by d, then f(d) may be computed by first determining the interval in table $P_1$ to which d belongs. If d is determined to lie within interval k, then f(d) may be computed as $f(d)=F_1[k]+S_1[k]\times(d-P_1[k])$. By applying lookup tables as described above, the computation of f(d) may be greatly simplified and easily and efficiently implemented in fixed-point (e.g. integer) computation. Moreover, the weighting function f may be easily changed by loading different tables $F_1$ and $S_1$ (and $P_1$ if desired). In such manner, filter design flexibility may be achieved.

The normalization operation may be an integer division approximated by multiplication and shifting operations. The multipliers may be stored as a lookup table whose size may depend on the range of the normalization factor in the particular application. So long as f_min, f_max, and the kernel size do not change, the method or apparatus may use the same multiplier table even if the weighting function f is changed.

Embodiments include a method that may be used to provide a simple-to-implement edge-preserving adaptive filter suitable for noise reduction in two-dimensional imaging applications. Such a method may be implemented to be highly flexible in that users may apply their own weighting functions as needed. Such a method may be implemented by a hardware configuration and/or in software for execution by a DSP (digital signal processing) unit or CPU (central processing unit). For example, a filter according to an embodiment may be implemented in hardware that is separate from a DSP unit or CPU.

Embodiments include methods and apparatus for adaptively filtering noise by using lookup tables to approximate a floating-point operation, wherein at least one lookup table contains sub-sampled values of at least one monotonically decreasing function and at least one lookup table contains pixel value differences.

FIG. 1 shows a diagram of a method 100 according to an embodiment. Task T200 assigns a weight to a pixel q. Task T300 iterates task T200 for each of a desired set of pixels Q in a neighborhood of a subject pixel C such that a weight is assigned to each of the pixels in Q. Method 100 may be implemented such that the set Q includes the subject pixel C, or it may be implemented such that set Q does not include C. Based on the values and assigned weights of the pixels in Q, task T400 calculates a new value for the subject pixel C.

Weight assignment task T200 includes subtasks T110 and T120. Task T110 calculates a distance D between the pixel q and the subject pixel C. Task T120 assigns a weight f(D) to the pixel q that is based on the calculated distance D.

Figure 2:
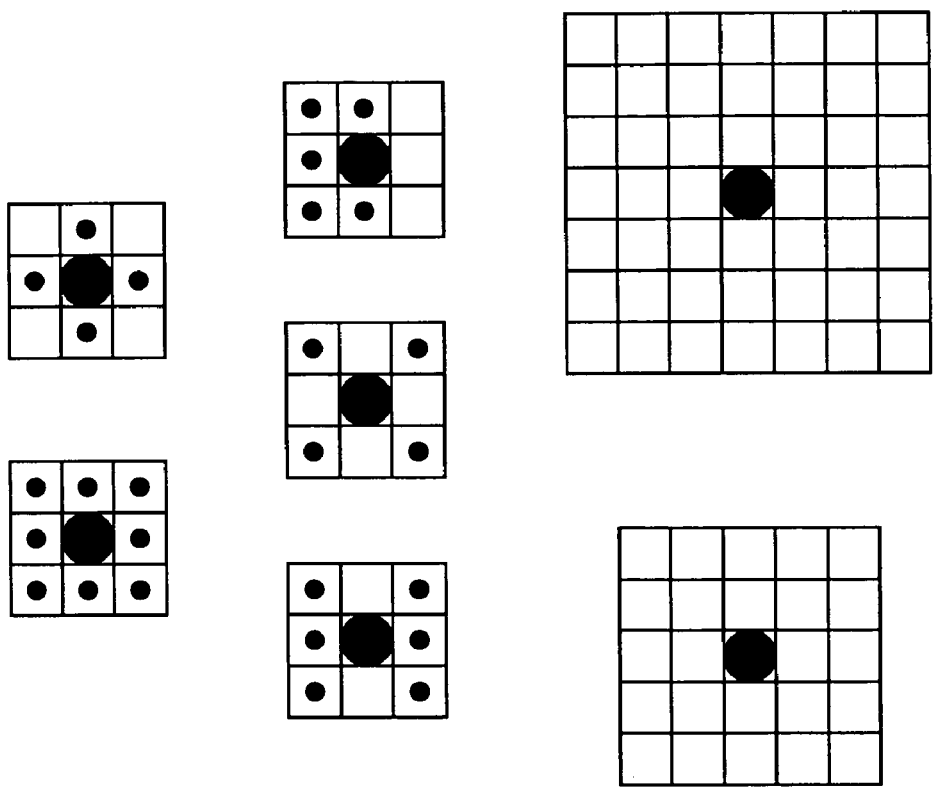
FIG. 2 shows examples of several pixel neighborhoods.

FIG. 2 shows several examples of neighborhoods that may be used in implementations of methods and apparatus as described herein, in which the subject pixel is indicated by a large dot and the neighbor pixels are indicated by small dots. As shown in the diagram on the left in the top row of FIG. 2, an eight-connected neighborhood may be used. Alternatively, as shown in the diagram on the right, a four-connected neighborhood may be used.

Other sets of pixels may also be selected for the neighborhood, some examples of which are shown in the second row of FIG. 2. Neighborhoods may be selected from e.g. 5×5 or 7×7 masks centered at the subject pixel, as shown in the third row of FIG. 2. It is also possible that the selected neighborhood Q may include pixels that are in another image (e.g. corresponding to a different moment in time) than the subject pixel.

The values of the pixels may be eight-bit unsigned integers in the range of 0 to 255. The principles described herein may also be applied to pixels having color values in the RGB space of more than eight bits (e.g. ten, twelve, fourteen). However, application of these principles is not limited to such pixel values, and in other cases (including other RGB cases) the pixel values may be signed integer or non-integer (fixed- or floating-point) values having fewer (e.g. four) or more (e.g. nine, twelve, fourteen, sixteen, seventeen, thirty-two) bits. It is also possible for some of the pixels to have different forms (e.g. for the values of the pixels in Q to differ in form from the value of pixel C), and task T400 may calculate a value that has a different form than the values of pixel C and/or the pixels in Q.

For pixels having color values in a multi-component space that includes a luminance or intensity component (e.g. HSV, YIQ, YUV, YCrCb, YDrDb, YPrPb), a method as described herein may be performed on the luminance or intensity component only. Alternatively, such a method may be performed on more components of the pixel values (e.g. all of the components). Methods and/or apparatus may also be applied such that different components of a pixel color value are processed in separate channels, with the method and/or apparatus being applied separately to one (or each of more than one) of the channels. It is possible that different components of an image may be sampled at different resolutions (such that, for example, two pixels representing different Y samples may represent the same Cr sample).

Task T110 calculates a distance D between the neighbor pixel q and the subject pixel C. For example, task T110 may calculate a photometric or radiometric distance (distance between intensity values). In other implementations, task T110 may calculate a geographic distance (distance between spatial values) and/or a temporal distance (distance between temporal values, which may correspond to the same or different spatial sampling points).

For one-dimensional pixel values (each representing e.g. intensity of a luminance, chrominance, or color component), the distance between two pixels may be measured as the difference (or the magnitude of the difference) between the pixel values. For multi-dimensional pixel values (each representing e.g. position in a two-dimensional (x, y) image plane), the distance between two pixels may be measured as the sum of the magnitude of the difference between the pixel values in each dimension (Manhattan distance, e.g. $|x_1-x_2|+|y_1-y_2|$), or as the maximum of those magnitudes (chessboard distance, e.g. $\max\{|x_1-x_2|, |y_1-y_2|\}$), or as the geometric mean of those magnitudes (Euclidean distance, e.g. $(|x_1-x_2|^2+|y_1-y_2|^2)^{1/2}$). Examples of other distance metrics that may be used include squared Euclidean distance, Chebyshev distance (e.g. $\max\{|x_i-y_i|\}$), and chamfer distance.

As noted above, a distance may be calculated based on a difference between two values. In some applications, a more approximate calculation of distance may suffice instead. For example, a distance between two unsigned binary integer values may be approximated based on a difference between the positions of their most significant high bits.

Task T120 assigns a weight f(D) to a neighbor pixel q based on the calculated distance D. It may be desirable for the function f to express a nonlinear inverse relationship between pixel value weight and pixel distance. The inverse relationship implies that values of more distant pixels are weighted less heavily, and the nonlinearity may be selected according to a desired discrimination between values of less distant and more distant pixels. One potential advantage of applying a nonlinear inverse relationship in an image filter is preservation of edges in a filtered image, although the embodiments disclosed herein are not limited to methods and apparatus having this advantage.

The weight-distance relationship f may have the form of a Gaussian, exponential, and/or polynomial expression. One example of an exponential relationship is $f(x)=\exp[-x/k)^2]$, where x denotes the distance and k denotes a process parameter. In the case where $k=2\sigma$, where $\sigma$ denotes a standard deviation, this equation also expresses a Gaussian relationship. One example of a polynomial relationship is $f(x)=(1+(x/k)^2)^{-1}$. However, these particular relationships are merely examples, and it will be understood that any variation or other function that expresses a monotonic decreasing relationship between value weight and distance may be used. From the discussion below, it will also be understood that the function f need not be easily characterizable by any algebraic expression, and that the function may be implemented in an approximate fashion and indeed may be defined instead by selecting a number of inflection points (e.g. knots).

Figure 3:
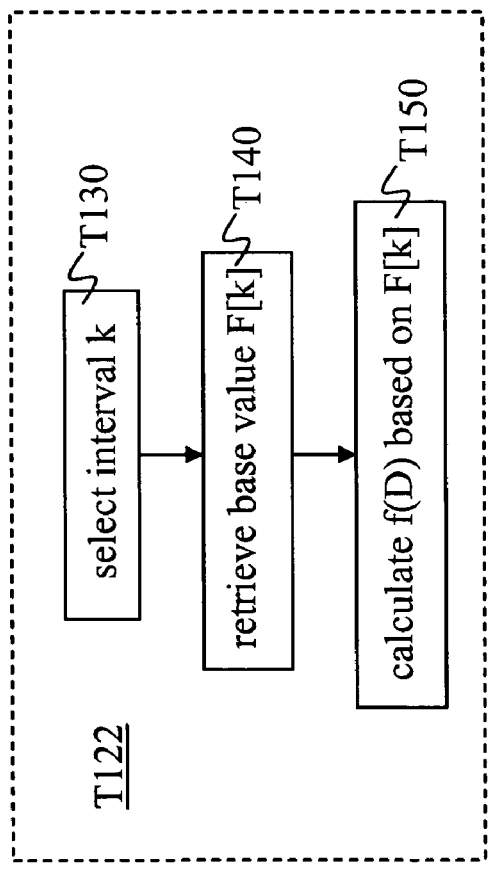
FIG. 3 shows a diagram of an implementation T122 of task T120.

FIG. 3 shows a diagram of an implementation T122 of task T120 that includes tasks T130, T140, and T150. Task T130 selects an interval k that includes the calculated distance D. Task T140 retrieves a base value F[k] that is associated with interval k, and task T150 calculates a value weight f(D) for pixel q that is based on F[k].

Task T110 selects interval k from among a set K of intervals that represent portions of a range R. Range R may be the range of possible or expected values of distance D as calculated in task T110 (or a selected portion of such range). In a case where task T110 calculates distance D as the magnitude of a difference between two unsigned 8-bit integers, for example, range R may be the range from 0 to 255.

Figure 4:
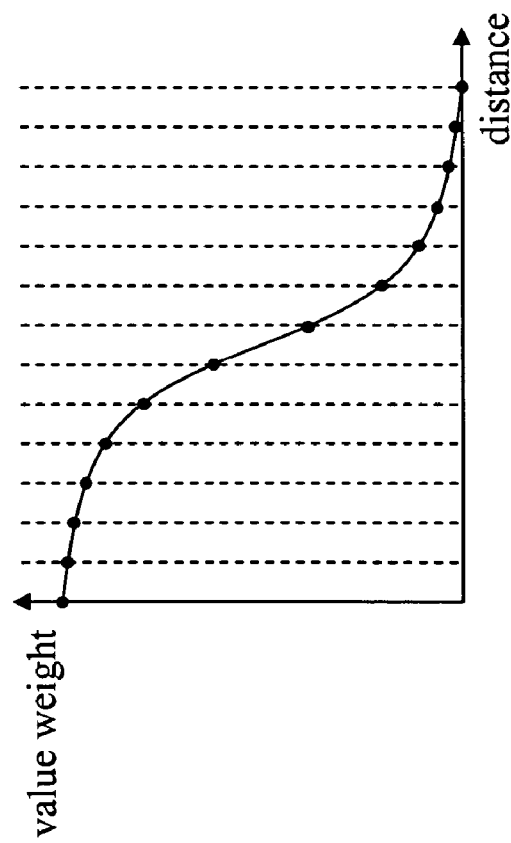
FIG. 4 shows an example of a range being divided into intervals.

FIG. 4 shows one example in which a range of expected distance values is divided into thirteen equal, adjacent, and nonoverlapping intervals. In other implementations, set K may include intervals that are nonequal, nonadjacent, and/or overlapping. In typical implementations, it may be desirable for the number of intervals in K to be eight, or ten, or sixteen, or twenty, although set K may have fewer (e.g. four) or more (even one hundred or more) intervals as desired for a particular application.

The various intervals in K may be characterized by a set P of values. For example, the values in P may be endpoints of intervals in K. The sets of values {31, 63, 95, 127, 159, 191, 223} and {32, 64, 96, 128, 160, 192, 224} are two examples of sets of endpoints that may be used to divide the range (0-255) into eight equal intervals (see, e.g., FIG. 5, where $f(x)=\exp[-(x/128)^2]$). In these two examples, the endpoints of the outer intervals (0 and 255) are assumed, although in other cases it may be desired to set forth those points explicitly.

Interval selection task T130 may include comparing the calculated distance D with one or more of the values in P. It may be desirable (e.g. for efficiency) to perform such an operation with the points in P being arranged in increasing or decreasing order as appropriate. FIG. 6a shows an example of a series of comparisons that may be performed for a case where the n values of P are arranged in order of increasing magnitude, and FIG. 6b shows an example of such a series as applied to the case P={31, 63, 95, 127, 159, 191, 223}.

It will be noted that in proceeding through the series of FIG. 6b from the left, the operation may be terminated at the first comparison whose result is false. For example, if the result of the comparison (D>31?) is false, then it is known that D is in the interval (0-31). In such case, the location of the first false result (or the overall absence of a false result) indicates the interval k in which D resides. Alternatively, a method or apparatus may proceed through this series from the right, in which case the operation may be terminated at the first comparison whose result is true. In such case, the location of the first true result (or the overall absence of a true result) indicates the interval k in which D resides.

FIG. 6c shows an example of an alternate series of comparisons, and FIG. 6d shows an example of such a series as applied to the case P={32, 64, 96, 128, 160, 192, 224}. In this case, when proceeding through the series from the left, the operation may be terminated at the first comparison whose result is true, and when proceeding through the series from the right, the operation may be terminated at the first comparison whose result is false.

It may be desirable in some implementations of task T130 to perform such a series of comparisons in parallel. In a processing architecture that is configured to execute single-instruction, multiple-data (SIMD) instructions, for example, it may be possible to perform the entire set of comparisons in one instruction cycle. The parallel comparison operation may be configured such that the resulting bit mask indicates the interval k in which D resides.

The intervals in K may be equal or nonequal, such that the points in P may be spaced equally or nonequally over range R. For example, it may be desirable for adjacent points in P to be closer together in regions of R where $|df/dD|$ (for $D \in R$) is large, as compared to regions of R where $|df/dD|$ is small. Such a distribution may have the advantage of supporting a better approximation of a smooth function f, or of supporting an acceptable approximation of a smooth function f with comparatively few intervals, although the embodiments disclosed herein are not limited to smooth functions f or to methods or apparatus having either of these advantages.

Figure 7:
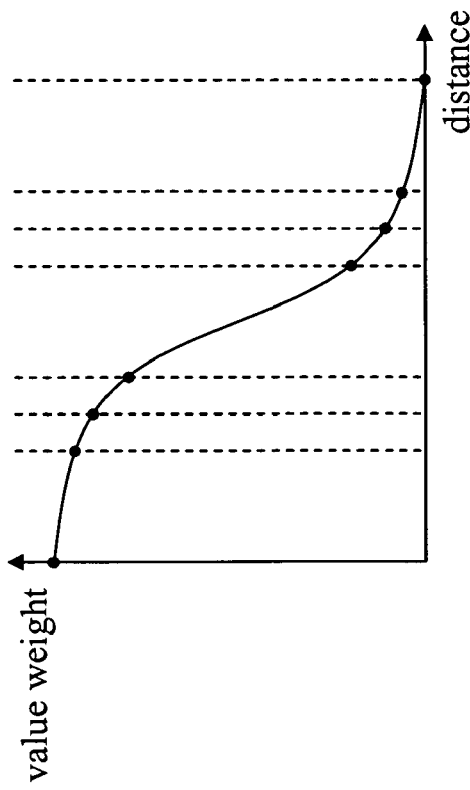
FIG. 7 shows an example of a range being divided into intervals of different widths.

FIG. 7 shows an example in which the range of expected distance values as shown in FIG. 4 is divided into seven intervals, some of which are larger than others. It will be understood that the points in P may be selected to promote accurate interpolation (e.g. piecewise linear interpolation) of function f within each interval.

In other implementations, the values in P may include other points characterizing the intervals in K (e.g. midpoints of the intervals), and interval selection task T130 may include calculating a distance between D and each of these values. In such case, task T130 may select the interval k which corresponds to the point in P that is closest to D (e.g. $\min\{|D-p|\} \forall p \in P$).

Figure 5:
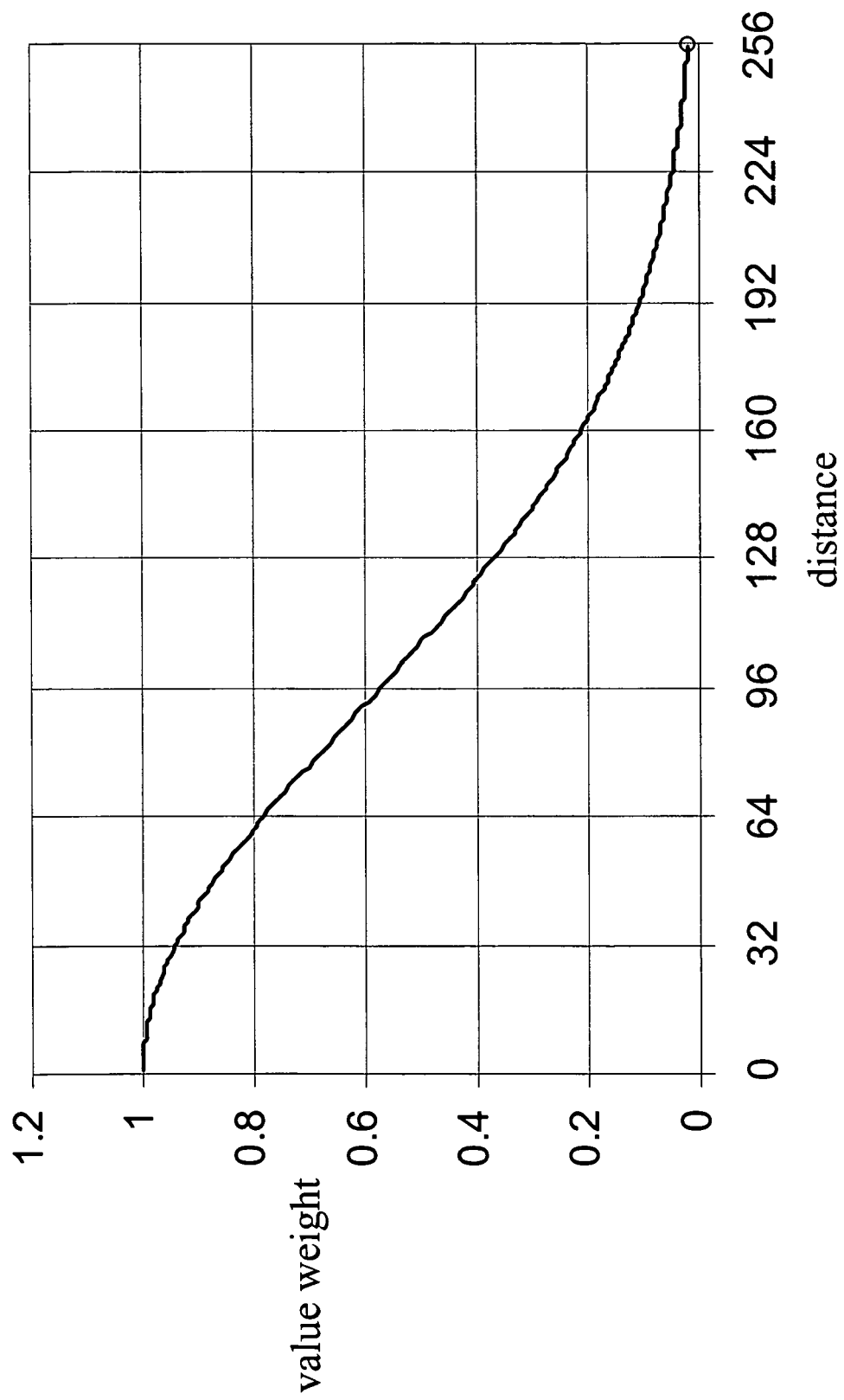
FIG. 5 shows an example of a weighting function f.

Task T140 retrieves a base value F[k] that is associated with interval k. FIG. 8a shows one example 110 of a lookup table F indexed by k (for k from 1 to 8) from which task T140 may retrieve F[k]. In this example, table 110 stores the values F[k] for function f as shown in FIG. 5, where each F[k] is the value of f at the lowest endpoint of the corresponding interval k. In other implementations as appropriate, each F[k] may be the value of f at the highest endpoint, or at some other point (e.g. midpoint), of the corresponding interval k.

It may be desirable to obtain fixed-point (e.g. integer) values for F[k] rather than floating-point values. For example, FIG. 8b shows another lookup table 120 that corresponds to the function f and intervals as shown in FIG. 5 but which stores only integer values. The values of table 120 are approximations of the values of table 110, and each is obtained by multiplying the corresponding value of table 110 by 128 and rounding the result. Use of such fixed-point values may permit arithmetic operations that are less computationally expensive (although possibly less precise) than floating-point operations. In this case, when a calculation that makes use of F[k] as a factor is complete, the factor of 128 may be removed by executing a seven-bit right shift on the result.

Task T150 calculates a value weight f(D) that is based on the base value F[k]. In some applications, it may be sufficient to adopt F[k] as the value of f(D). In other implementations, task T150 calculates f(D) by calculating a correction to F[k] according to a distance between (a) the value at which F[k] was evaluated and (b) distance D. For example, f(D) may be interpolated from F[k] along a line connecting the endpoints of interval k.

Figure 9:
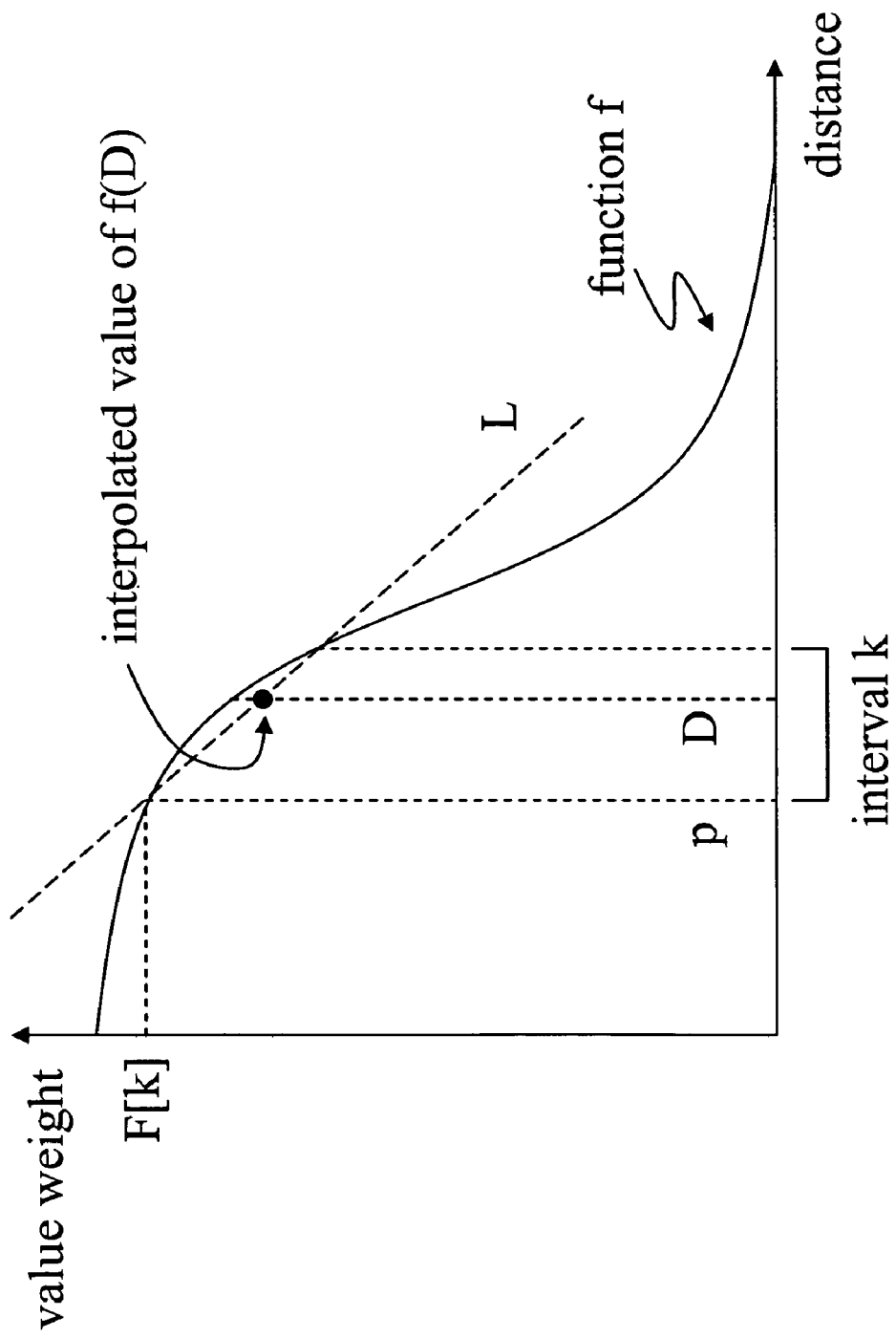
FIG. 9 shows an example of a linear interpolation of f(D).

Task T150 may be implemented to calculate a linearly interpolated value of f(D) as a function of the terms F[k] and (L×G), where L denotes the slope of a line connecting the endpoints of interval k and G denotes a distance between (a) the value at which F[k] was evaluated and (b) distance D. In a case where F[k] is evaluated at the lesser endpoint of interval k, for example, task T150 may calculate f(D) according to an expression such as f(D)=F[k]+(L×(D−p)), where p is the point at which F[k] was evaluated. FIG. 9 shows a diagram of such an interpolation. In a case where F[k] is evaluated at the greater endpoint of interval k, task T150 may calculate f(D) according to an expression such as f(D)=F[k]−(L×(p−D)).

Retrieval task T140 may also retrieve the values of L and p that correspond to interval k from lookup tables. FIG. 10a shows an example of three lookup tables, all indexed by k, for function f as shown in FIG. 5: base value table F, slope value table S, and evaluation point table P. For a case in which F[k] is evaluated at the lesser endpoint of each interval in K (as in FIG. 10a), task T150 may calculate f(D) according to an expression such as f(D)=F[k]+(S[k]×(D−P[k])). For a case in which F[k] is evaluated at the greater endpoint of each interval in K, task T150 may calculate f(D) according to an expression such as f(D)=F[k]−(S[k]×(D−P[k])).

Figure 11:
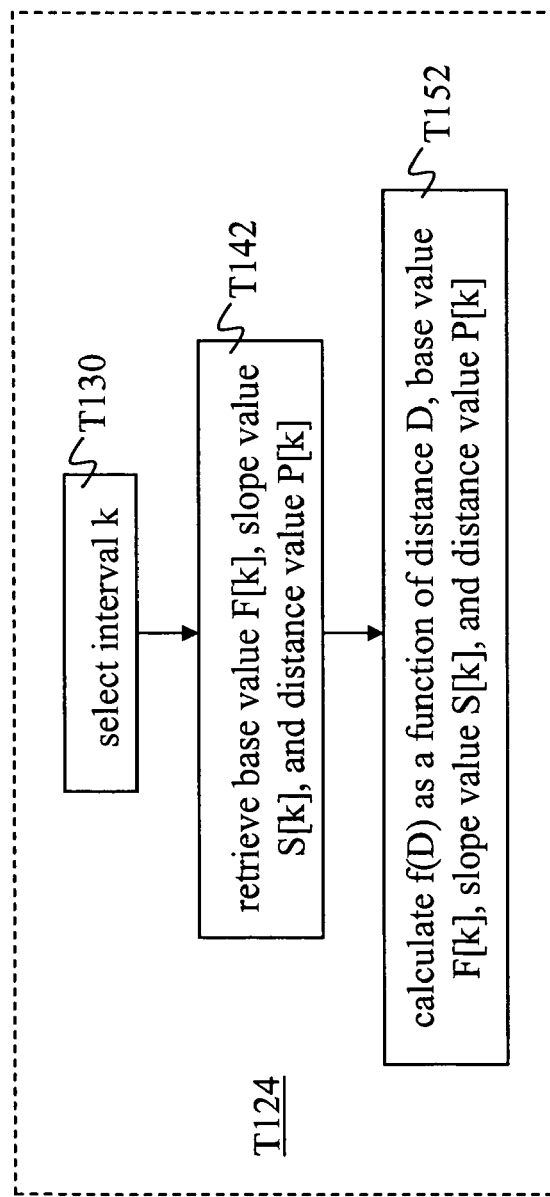
FIG. 11 shows a diagram of an implementation T124 of task T120.

FIG. 11 shows a diagram of an implementation T124 of task T120 that includes tasks T130, T142, and T152. Implementation T142 of task T140 retrieves a base value F[k], a slope value S[k], and a distance value P[k] that are associated with interval k. Implementation T152 of task T150 calculates a value weight f(D) for pixel q that is based on F[k], S[k], and P[k].

One or more of the tables F, S, and P may be implemented to permit computation of f(D) in a desired fashion. For example, FIG. 10b shows another set of lookup tables that corresponds to the set as shown in FIG. 10a but which stores only fixed-point values. Specifically, in this example the values of F[k] are multiplied by 128 ($2^7$) and the values of S[k] are multiplied by 4096 ($2^{12}$). In this case, f(D) may be calculated as f(D)=(F[k]+((S[k]×(D−P[k]))>>5))>>7, where >>is the bitwise right shift operator.

Tables F, S, and P may be implemented as separate tables, each being accessed independently of the other. Alternatively, one or more of these tables may be implemented together such that only one table access is required to retrieve more than one of the values F[k], S[k], and P[k]. In some implementations, for example, it may be less expensive to retrieve multiple values at once and separate them locally than to perform multiple memory accesses. In any case, a method or apparatus according to an embodiment may apply a different weighting function from one pixel to the next (and/or from one image to the next) by, for example, configuring task T140 to retrieve values from different sets of lookup tables, each set corresponding to a different weighting function f. Alternatively, a different weighting function may be applied by changing the contents of tables F and S (e.g. loading new tables F and S) to values suitable for the desired new weighting function.

In other embodiments, interpolation of f(D) from F[k] may be based on nonlinear functions (e.g. polynomials, splines). In such a case, task T150 may be implemented to calculate a value weight f(D) based on distance D, base value F[k], a distance value P[k], and an interpolation parameter (S[k] retrieved from table S being one example of such a parameter).

In further embodiments, task T150 may calculate a slope or other interpolation parameter from evaluations of function f at endpoints (and possibly at other points) of interval k. For example, the slope of a line over an interval 32 bits wide may be easily calculated as [((value of f at greater endpoint)−(value of f at lesser endpoint))>>5].

In further implementations, base value F[k] is calculated at run-time. In such cases, the endpoints of interval k may be selected such that f(k) is easily calculated at those points.

Task T400 calculates a new value C' for the subject pixel C. In some implementations, C' may be based only on weighted values of the pixels in Q. For example, C' may be calculated as a normalized sum of weighted values of the pixels in Q:

$$C' = \frac{\sum_{q \in Q} w_q q}{\sum_{q \in Q} w_q}, \quad (1)$$

where $w_q$ denotes the value weight f(D) as calculated for pixel q in task T200. It may be desirable in some embodiments to implement the summation of the weighted values as a dot product of a vector of the value weights $w_q$ and a corresponding vector of the pixel values q.

Utilization of the value weights f(D) to calculate a new value for the subject pixel may also include one or more sorting or statistical operations. For example, it may be desired to calculate C' using only a subset of the values of the pixels in Q. In one example of such a method, of a set Q of eight neighbor pixels, only the values of the four pixels having the highest weights are used in calculating C'. In such cases, C' may be calculated as a normalized sum of weighted values of the pixels in a selected subset V of Q:

$$C' = \frac{\sum_{q \in V} w_q q}{\sum_{q \in V} w_q}. \quad (2)$$

In other implementations, C' may also be based on a separately weighted value of subject pixel C (e.g. for a case in which C∉Q). For example, C' may be calculated as:

$$C' = aC + (1-a)\frac{\sum_{q \in Q} w_q q}{\sum_{q \in Q} w_q}, \quad (3)$$

where a is a weight value that may be constant for the application or may be selected based on, e.g., a characteristic of an image being filtered (e.g. standard deviation of the image or neighborhood, etc.).

The values f(D) (e.g. as calculated by task T150) may be modified before C' is calculated. For example, the values f(D) may themselves be weighted according to a spatial pattern (e.g. a Sobel edge detection mask). In a further embodiment, C' is calculated using value weights derived from more than one weighting function. For example, C' may be calculated according to an expression of the form:

$$C' = \left( b\frac{\sum_{q \in V_1} w1_q q}{\sum_{q \in V_1} w1_q} + (1-b)\frac{\sum_{q \in V_2} w2_q q}{\sum_{q \in V_2} w2_q} \right), \quad (4)$$

where value weights w1 are calculated (e.g. by task T200) using a function f and a distance measure (e.g. photometric distance), value weights w2 are calculated (e.g. by task T200) using a different function f and/or distance measure (e.g. geographical distance), and b is a weight value that may be constant for the application or may be selected based on, e.g., a characteristic of an image being filtered (e.g. standard deviation of the image or neighborhood, etc.). The sets $V_1$ and $V_2$ may be the same or different subsets of Q, and one or both of these sets may be equal to Q.

As shown in expressions (1)-(4), normalization may be performed by dividing each summation of weighted values by the sum of the value weights. Alternatively, normalization may be performed on each value weight individually. If only a subset V of the set Q is being used, it may be desirable to perform normalization after the subset V is selected.

A division operation may be computationally expensive. Therefore, it may be desirable to simplify a division operation as used in normalization. In one such simplification, the division operation is implemented using multiplicative division (e.g. comprising multiplication and/or binary shift operations). For example, a division by 3 may be approximated using a multiplication by 85 (≈256/3) followed by a right shift of 8 ($\log_2 256$). Task T400 may include performing a normalization operation by retrieving and applying such values. FIGS. 12a and 12b show examples of tables of multipliers and right shifts that may be used by such an implementation of task T400 to perform division by values up to 4.0 at two different resolutions.

From the description herein, it will be understood that embodiments may be implemented to have aspects that may be desired or advantageous in particular applications. For example, a method or apparatus may be implemented such that the weighting function f may be changed at any time (e.g. by loading new lookup tables F and S), even during run-time. An embodiment may be implemented such that any desired weighting function may be applied (e.g. by piecewise linear interpolation) by logging the function into a small lookup table. A method or apparatus may be implemented that determines a value weight for each neighbor pixel by a small set of simple operations—table lookup, two integer additions, one integer multiplication, and a bitwise shift—regardless of the complexity of the weighting function. A method or apparatus may be implemented to have one or more or even all of these aspects. However, it will also be understood that such aspects are not limitations or requirements, and that the embodiments disclosed herein are not limited to methods or apparatus having any of these aspects.

Figure 13:
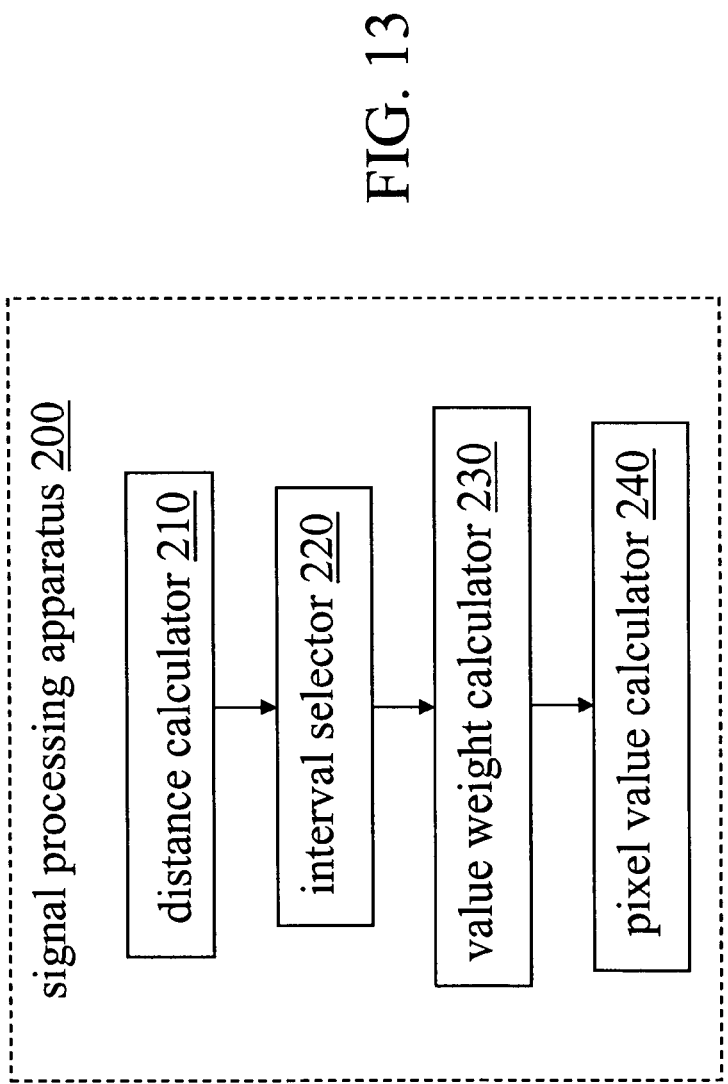
FIG. 13 shows a diagram of signal processing apparatus 200.

FIG. 13 shows a block diagram of a signal processing apparatus 200 according to an embodiment. Distance calculator 210 calculates a distance D between subject pixel C and neighbor pixel q (e.g. by performing an implementation of task T110 as described herein). Interval selector 220 selects an interval that includes distance D. Based on the selected interval, value weight calculator 220 assigns a weight f(D) to neighbor pixel q (e.g. by performing an implementation of task T120 as described herein). Calculator 210, selector 220, and calculator 230 perform such operations for each pixel in a set Q as described herein. Pixel value calculator 240 calculates a new value for subject pixel C (e.g. by performing an implementation of task T400 as described herein) based on one or more of the weights f(D) produced by value weight calculator 230.

In one implementation, apparatus 200 includes one or more processors or other arrays of logic elements that execute machine-readable code obtained from a storage device (e.g. memory). For example, a single processor may be configured in accordance with such code (e.g. sets of instructions) to have the structures of one or more of distance calculator 210, interval selector 220, value weight calculator 230, and pixel value calculator 230 at different times. Such a processor may be a microprocessor or other digital signal processing unit and may be a stand-alone or embedded device. Such a processor may also be fabricated into an application-specific integrated circuit (ASIC) or application-specific standard product (ASSP), or programmed into a field-programmable gate array (FPGA) or similar device. In the context of a device or system including apparatus 200, such a processor may also be used to execute other sets of instructions, e.g. for activities not directly related to operation of apparatus 200.

Figure 14:
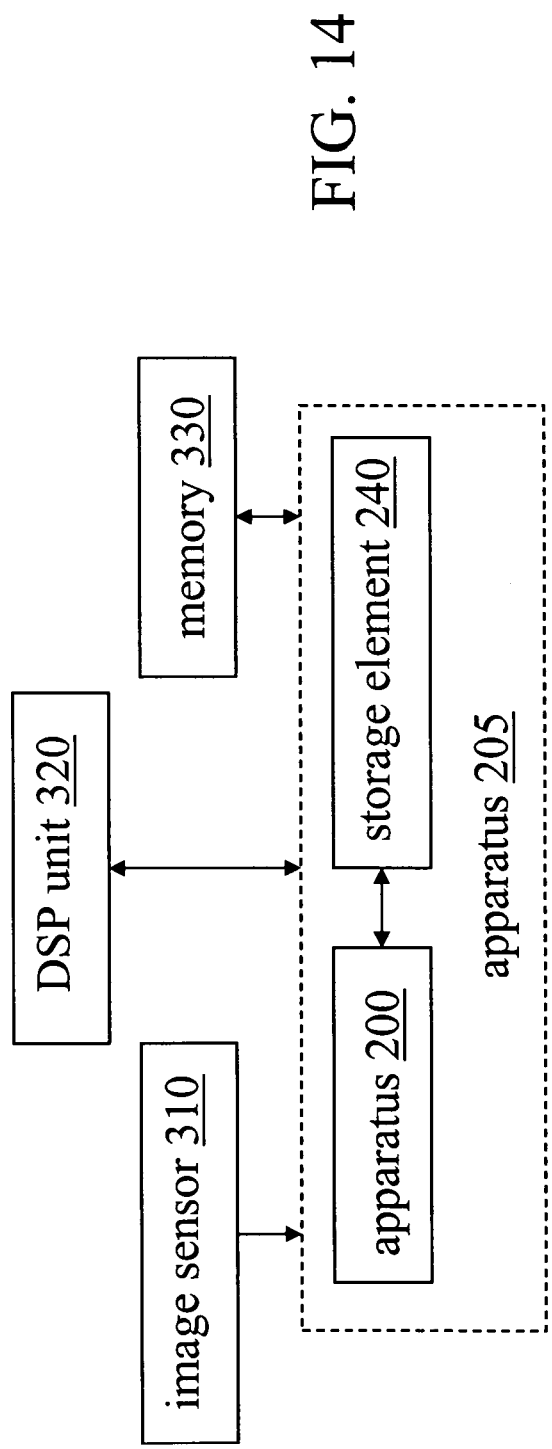
FIG. 14 shows a diagram of a system including apparatus 205.

Method 100 may be performed by a dedicated array of logic elements (e.g. ASIC, ASSP, FPGA, etc.) or a dedicated portion of such an array. FIG. 14 shows a diagram of a system including an apparatus 205 implemented in such an array. Apparatus 205 receives and filters an image signal from image sensor 310 and stores the filtered image in an external memory 330 (e.g. a semiconductor or magnetic random-access memory). Apparatus 205 may also communicate with an external DSP unit or other processor 320. For example, external processor 320 may load tables F, S, and/or P into storage element 240 (e.g. to change the function f being applied by apparatus 205) or cause such tables to be loaded, may perform pre- or post-processing of the image processed by apparatus 205, and may control or otherwise configure apparatus 205.

Apparatus 205 includes an implementation of apparatus 200 and local storage element 240 for lookup tables (e.g. tables F, S, P, and/or tables to support multiplicative division as disclosed herein). Storage element 240 (e.g. an array of semiconductor or magnetic memory cells, such as static or dynamic random-access memory) may reside on the same chip as, or on one or more different chips from, apparatus 200. Storage element 240 may also reside in the same package (e.g. a ball grid array (BGA), a thin shrink small outline plastic package (TSSOP), etc.) as apparatus 200. Other implementations of apparatus 205 may include a buffer between sensor 310 and apparatus 200 (e.g. such that values for the pixels in Q may be available for calculation of C'). Apparatus 205 may include a portable housing (e.g. metal and/or plastic, as for a cellular telephone or camera) that houses the components, and may also include a portable power source such as a battery, fuel cell, or charge storage device such as a supercapacitor.

Potential applications of the principles described herein include processing an image by performing an implementation of method 100 for some, many, or substantially all pixels of the image (e.g. with suitable modification with respect to pixels at the spatial image boundaries).

Figure 15:
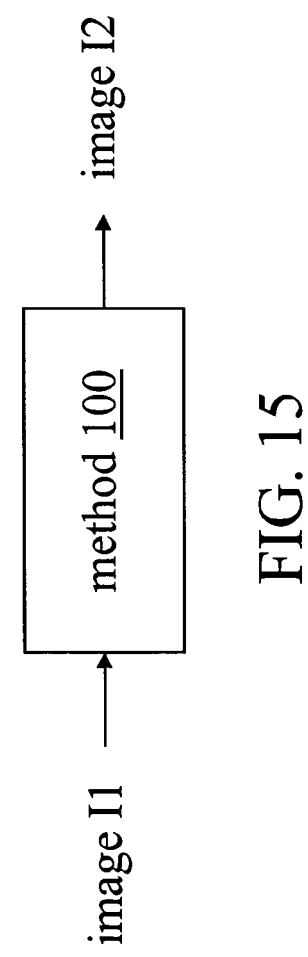
FIG. 15 shows a diagram of an application of method 100.

In one such application as diagrammed in FIG. 15, a filtered image I2 is obtained by applying an implementation of method 100 (e.g. using an apparatus 200) to each pixel in at least a portion of an image I1, such that each pixel in I2 based on a neighborhood of the corresponding pixel in I1. Such a method may be applied iteratively, e.g. as a convolution mask, possibly using different weighting functions f (and/or different sizes or configurations of neighborhood Q) for different subject pixels in image I1 and/or from one image to the next (e.g. in filtering a video sequence).

Embodiments include apparatus configured to perform one or more methods as disclosed herein, devices including such an apparatus, and systems including such an apparatus or device. For example, such embodiments include cameras (still and/or video), portable communications devices such as cellular telephones, PDAs, wireless cameras, and wearable cameras. Such a device or system may include a sensor (e.g. a CMOS or CCD image sensor) configured to provide an image signal to such an apparatus, which is configured to filter the signal and provide a filtered image to a storage element (e.g. semiconductor or magnetic memory) and/or to a display (e.g. a liquid-crystal or other flat-panel display, or a cathode-ray tube display).

Figure 16:
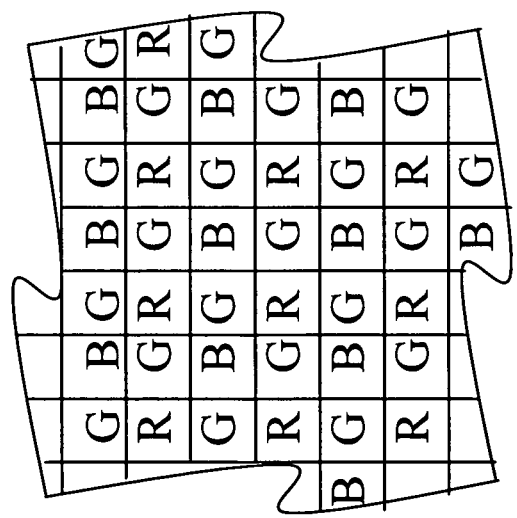
FIG. 16 shows a diagram of a portion of a sensor having a Bayer filter.

An apparatus 200 may receive an image captured using a Bayer filter. FIG. 16 shows one example of such a filter, which may be used to derive several component images (e.g. R, G, B) from a monochrome sensor. Subsequent to capture, the Bayer filtered image is processed using a de-mosaicing operation to obtain the component images. An implementation of method 100 or apparatus 200 may be applied to the raw sensor signal (e.g. with appropriate selection of set Q, such as limiting Q to pixels having the same color filter as the subject pixel) and/or to one or more of the component image signals after de-mosaicing.

The foregoing presentation of the described embodiments is provided to enable any person skilled in the art to make or use the structures and methods claimed herein. Various modifications to these embodiments are possible, and the generic principles presented herein may be applied to other embodiments as well. For example, such principles may be applied to image signals obtained using non-visible radiation, such as radiation at microwave frequencies (e.g. synthetic aperture radar (SAR) images).

An embodiment may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. Embodiments of the invention also include computer programs containing one or more sets (e.g. sequences) of machine-executable instructions describing a method as disclosed herein, and data storage media (e.g. semiconductor or magnetic memory such as ROM or RAM, magnetic or optical disk) having such sets of instructions stored therein. Thus, the present invention is not intended to be limited to the embodiments shown above but rather is to be accorded the widest scope consistent with the principles and novel features disclosed in any fashion herein.

What is claimed is:

1. An apparatus for processing an image including a subject pixel, said apparatus comprising:

a distance calculator configured to calculate, for each of a plurality of neighbor pixels in a neighborhood of the subject pixel, a distance between the neighbor pixel and the subject pixel;

an interval selector configured to select, for each of the calculated distances and from among a plurality of intervals, an interval that includes the calculated distance;

a value weight calculator configured to calculate, for each of the plurality of neighbor pixels, a value weight based on the corresponding selected interval; and a pixel value calculator configured to calculate a value for the subject pixel based on values of the neighbor pixels by weighting the value of each of the plurality of neighbor pixels by the corresponding value weight.

2. The apparatus for processing an image according to claim 1, wherein said value weight calculator is configured to calculate, based on the corresponding calculated distance, a value weight according to a monotonically decreasing nonlinear relation between value weight and distance.

3. The apparatus for processing an image according to claim 1, wherein said distance calculator is configured to calculate the distance between the neighbor pixel and the subject pixel as a difference between an intensity value of the neighbor pixel and an intensity value of the subject pixel.

4. The apparatus for processing an image according to claim 1, wherein said interval selector is configured to select the interval that includes the calculated distance by comparing the calculated distance to an endpoint of each of a plurality of the intervals.

5. The apparatus for processing an image according to claim 1, wherein said interval selector is configured to select the interval that includes the calculated distance by comparing the calculated distance to an endpoint of each of a plurality of the intervals in parallel.

6. The apparatus for processing an image according to claim 1, wherein said value weight calculator is configured to calculate a value weight based on the corresponding selected interval by reading a base value associated with the interval and calculating, based on the corresponding calculated distance, a correction to the base value.

7. The apparatus for processing an image according to claim 6, said apparatus comprising a storage element configured to store a first set of entries characterizing a first monotonically decreasing nonlinear dependence of value weight on distance, wherein said value weight calculator is configured to read the base value from the first set, and wherein the storage element is configured to store, in place of the first set, a second set of entries characterizing a second monotonically decreasing nonlinear relation between weight and distance, said second set being different than the first set and said second relation being different than the first relation; and wherein, subsequent to processing the image, said apparatus is configured to process a second image including a subject pixel and said value weight calculator is configured to read a base value from the second set.

8. The apparatus for processing an image according to claim 6, wherein said value weight calculator is configured to calculate a value weight based on the corresponding selected interval by reading an interpolation parameter associated with the interval and calculating the correction to the base value based on the interpolation parameter.

9. The apparatus for processing an image according to claim 1, said apparatus comprising an image sensor configured to capture the image.

10. The apparatus for processing an image according to claim 1, said apparatus comprising a storage element configured to store a plurality of sets of values, each set associated with a corresponding one of the plurality of intervals and including an interpolation parameter, a distance value, and a value of a monotonically decreasing nonlinear relation between value weight and distance at the corresponding distance value, wherein the value weight calculator is configured to calculate the value weight based on the set of values associated with the corresponding selected interval.

11. The apparatus for processing an image according to claim 10, wherein at least one of the distance calculator, the interval selector, the value weight calculator, and the pixel value calculator is fabricated in the same package as the storage element.

12. The apparatus for processing an image according to claim 10, said apparatus comprising:

an image sensor configured to capture the image; and a housing configured to house the image sensor, the storage element, and a portable power source.

13. The apparatus for processing an image according to claim 10, wherein at least one of the distance calculator, the interval selector, the value weight calculator, and the pixel value calculator is implemented as a dedicated array of logic elements.

14. The apparatus for processing an image according to claim 10, said apparatus comprising a processor, wherein at least one of the distance calculator, the interval selector, the value weight calculator, and the pixel value calculator comprises a set of instructions executable by the processor.

15. An apparatus for processing an image including a subject pixel, said apparatus comprising:

means for calculating, for each of a plurality of neighbor pixels in a neighborhood of the subject pixel, a distance between the neighbor pixel and the subject pixel;

means for selecting, for each of the calculated distances and from among a plurality of intervals, an interval that includes the calculated distance;

means for obtaining, for each of the plurality of neighbor pixels, a value weight based on the corresponding selected interval; and means for calculating a value for the subject pixel based on values of the neighbor pixels, said calculating a value comprising weighting the value of each of the plurality of neighbor pixels by the corresponding value weight.

16. The apparatus for processing an image according to claim 15, said apparatus comprising:

means for storing a plurality of sets of values, each set associated with a corresponding one of the plurality of intervals and including an interpolation parameter, a distance value, and a value of a monotonically decreasing nonlinear relation between value weight and distance at the corresponding distance value;

an image sensor configured to capture the image; and a housing configured to house the image sensor, the means for storing, and a portable power source, wherein the means for obtaining a weight value is configured to calculate the value weight based on the set of values associated with the corresponding selected interval.

17. A method of processing an image including a subject pixel, said method comprising:

(a) for each of a plurality of neighbor pixels in a neighborhood of the subject pixel, calculating a distance between the neighbor pixel and the subject pixel;

(b) for each of the calculated distances, and from among a plurality of intervals, selecting an interval that includes the calculated distance;

(c) for each of the plurality of neighbor pixels, obtaining a value weight based on the corresponding selected interval; and (d) calculating a value for the subject pixel based on values of the neighbor pixels, said calculating a value comprising weighting the value of each of the plurality of neighbor pixels by the corresponding value weight.

18. The method of processing an image according to claim 17, wherein said obtaining a value weight comprises calculating, based on the corresponding calculated distance, a value weight according to a monotonically decreasing nonlinear relation between value weight and distance.

19. The method of processing an image according to claim 17, wherein said calculating a distance includes calculating a difference between an intensity value of the neighbor pixel and an intensity value of the subject pixel.

20. The method of processing an image according to claim 17, wherein said selecting an interval that includes the calculated distance comprises comparing the calculated distance to an endpoint of each of a plurality of the intervals.

21. The method of processing an image according to claim 17, wherein said obtaining a value weight based on the corresponding selected interval includes reading a base value associated with the interval and calculating, based on the corresponding calculated distance, a correction to the base value.

22. The method of processing an image according to claim 21, said method comprising:
loading a first set of entries characterizing a first monotonically decreasing nonlinear dependence of value weight on distance, wherein said reading a base value comprises reading from the first set;
loading a second set of entries characterizing a second monotonically decreasing nonlinear relation between weight and distance, said second set being different than the first set and said second relation being different than the first relation; and
performing acts (a), (b), (c), and (d) on a second image including a subject pixel, wherein said act (c) as performed on the second image includes reading, from the indexed set, a base value associated with the interval and calculating, based on the corresponding calculated distance, a correction to the base value.

23. The method of processing an image according to claim 21, wherein said calculating a correction to the base value includes reading an interpolation parameter associated with the interval.

24. The method of processing an image according to claim 23, wherein said calculating a correction to the base value includes reading a distance associated with the interval and calculating a correction to the base value based on (a) the interpolation parameter and (b) a difference between the calculated distance and the read distance.

25. The method of processing an image according to claim 23, wherein said obtaining a value weight comprises calculating, based on the corresponding calculated distance, a value weight according to a monotonically decreasing nonlinear relation between value weight and distance,
wherein the interpolation parameter represents a slope of a line that approximates the monotonically decreasing nonlinear relation across the interval.

26. The method of processing an image according to claim 17, said method comprising normalizing a sum of the weighted values of the plurality of neighbor pixels, said normalizing including:
reading a value associated with a sum of the plurality of value weights;
multiplying a sum of the weighted values of the plurality of neighbor pixels by the read value to obtain an intermediate value; and
right-shifting the intermediate value.

27. A computer-readable medium storing a computer program product having code for causing a computer to process an image including a subject pixel, comprising:
(a) code for causing a computer to calculate a distance between the neighbor pixel and the subject pixel for each of a plurality of neighbor pixels in a neighborhood of the subject pixel;
(b) code for causing a computer to select an interval that includes the calculated distance for each of the calculated distances;
(c) code for causing a computer to obtain a value weight based on the corresponding selected interval for each of the plurality of neighbor pixels; and
(d) code for causing a computer to calculate a value for the subject pixel based on values of the neighbor pixels, comprising weighting the value of each of the plurality of neighbor pixels by the corresponding value weight.

28. The computer-readable medium according to claim 27, wherein said code for causing a computer to obtain a value weight comprises code for causing a computer to calculate, based on the corresponding calculated distance, a value weight according to a monotonically decreasing nonlinear relation between value weight and distance.

29. The computer-readable medium according to claim 27, wherein said code for causing a computer to calculate a distance includes code for causing a computer to calculate a difference between an intensity value of the neighbor pixel and an intensity value of the subject pixel.

30. The computer-readable medium according to claim 27, wherein said code for causing a computer to select an interval comprises code for causing a computer to compare the calculated distance to an endpoint of each of a plurality of the intervals.

31. The computer-readable medium according to claim 27, wherein said code for causing a computer to obtain a value weight includes code for causing a computer to read a base value associated with the interval and calculate, based on the corresponding calculated distance, a correction to the base value.

32. The computer-readable medium according to claim 31 comprising:
code for causing a computer to load a first set of entries characterizing a first monotonically decreasing nonlinear dependence of value weight on distance, wherein said code for causing a computer to read a base value comprises code for causing a computer to read from the first set;
code for causing a computer to load a second set of entries characterizing a second monotonically decreasing nonlinear relation between weight and distance, said second set being different than the first set and said second relation being different than the first relation; and
code for causing a computer to perform codes (a), (b), (c), and (d) on a second image including a subject pixel, wherein said code (c) as performed on the second image includes code for causing a computer to read, from the indexed set, a base value associated with the interval and calculate, based on the corresponding calculated distance, a correction to the base value.

33. The computer-readable medium according to claim 31, wherein said code for causing a computer to calculate a correction to the base value includes code for causing a computer to read an interpolation parameter associated with the interval.

34. The computer-readable medium according to claim 33, wherein said code for causing a computer to calculate a correction to the base value includes code for causing a computer to read a distance associated with the interval and calculate a correction to the base value based on (a) the interpolation parameter and (b) a difference between the calculated distance and the read distance.

35. The computer-readable medium according to claim 33, wherein said code for causing a computer to obtain a value weight comprises code for causing a computer to calculate, based on the corresponding calculated distance, a value weight according to a monotonically decreasing nonlinear relation between value weight and distance, wherein the interpolation parameter represents a slope of a line that approximates the monotonically decreasing nonlinear relation across the interval.

36. The computer-readable medium according to claim 27, comprising code for computer program to normalize a sum of the weighted values of the plurality of neighbor pixels, including:
    code for causing a computer to read a value associated with a sum of the plurality of value weights;
    code for causing a computer to multiply a sum of the weighted values of the plurality of neighbor pixels by the read value to obtain an intermediate value; and
    code for causing a computer to right-shift the intermediate value.

* * * * *